United States Patent
Hazen et al.

(10) Patent No.: US 6,989,413 B2
(45) Date of Patent: *Jan. 24, 2006

(54) POLYESTER TACKIFIER AND ADHESIVE COMPOSITION

(75) Inventors: John Hazen, Spaubeek (NL); Patrick Peter Mario Aarts, Elsloo (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/456,429

(22) Filed: Jun. 6, 2003

(65) Prior Publication Data

US 2003/0212201 A1 Nov. 13, 2003

Related U.S. Application Data

(62) Division of application No. 09/785,098, filed on Feb. 16, 2001, now Pat. No. 6,653,398.

(60) Provisional application No. 60/183,310, filed on Feb. 17, 2000.

(30) Foreign Application Priority Data

Feb. 17, 2000 (EP) .................................. 00850030

(51) Int. Cl.
*C08L 93/04* (2006.01)

(52) U.S. Cl. ................... 524/270; 524/845; 525/54.52; 528/295.5; 156/332

(58) Field of Classification Search ........ 524/270–271, 524/845, 274; 525/54.42, 54.52; 528/395.5, 528/295, 295.5; 156/322, 332

See application file for complete search history.

(56) References Cited

U.S. PATENT DOCUMENTS

| | | | | |
|---|---|---|---|---|
| 2,560,033 A | * | 7/1951 | Nanfeldt | 428/339 |
| 3,072,519 A | * | 1/1963 | Salzman | 156/200 |
| 3,345,206 A | * | 10/1967 | Korpman | 428/355 AK |
| 3,438,918 A | * | 4/1969 | Arlt, Jr. et al. | 524/513 |
| 4,058,645 A | | 11/1977 | Steiner | 428/331 |
| 4,352,897 A | | 10/1982 | Ogata et al. | 523/220 |
| 4,457,718 A | | 7/1984 | Lerner | 434/98 |
| 4,876,304 A | | 10/1989 | Mertz | 524/314 |
| 4,981,939 A | | 1/1991 | Matsumura et al. | 527/604 |
| 5,120,781 A | * | 6/1992 | Johnson, Jr. | 524/274 |
| 5,420,229 A | | 5/1995 | Burke et al. | 528/335 |
| 5,552,519 A | | 9/1996 | Hemmings et al. | 530/216 |
| 5,912,214 A | | 6/1999 | Zehler et al. | 508/485 |

FOREIGN PATENT DOCUMENTS

| | | |
|---|---|---|
| GB | 1178732 | 1/1970 |
| WO | WO 94/12272 | 6/1994 |
| WO | WO 99/42508 | 8/1999 |

OTHER PUBLICATIONS

Chemical Abstract; XP002143926, Manufacture of resins for pressure sensitive adhesives, Jun. 13, 1994, vol. 120, No. 24.
Database WPI, XP002143927, New polyester with good adhesion to polymers-with good thermal stability and extensibility, Aug. 15, 1985, Section Ch, Week 198539.
Berry, D.A., et al., Novel Rosin Derivatives as Tackifiers For Pressure Sensitive Adhesives, Dec. 1970, vol. 13, No. 12, pp. 16-19.
European Search Report for EP00850030, 3 pgs.

* cited by examiner

*Primary Examiner*—Peter Szekely
(74) *Attorney, Agent, or Firm*—Michelle J. Burka

(57) ABSTRACT

The invention relates to a novel polyester tackifier, adhesive compositions comprising the tackifier and methods of preparation. More specifically, the polyester tackifier is obtainable by polymerising a mixture comprising a diacid or derivative thereof, a diol, and at least 6 molar % of an organic monofunctional compound, wherein the mixture is essentially free from compounds comprising more than two carboxylic acid groups or alcohol groups.

19 Claims, No Drawings

POLYESTER TACKIFIER AND ADHESIVE COMPOSITION

This application is a division of U.S. application Ser. No. 09/785,098, filed Feb. 16, 2001 now U.S. Pat. No. 6,653, 398, which claims priority based on European Patent Application No. 00850030.8, Filed Feb. 17, 2000, and U.S. Provisional Patent Application No. 60/183,310, filed Feb. 17, 2000.

This invention relates to a novel polyester tackifier, adhesive compositions comprising the tackifier and methods of preparation. More specifically, the polyester tackifier is obtainable by polymerising a mixture comprising a diacid or derivative thereof, a diol, and at least 6 molar % of an organic monofunctional compound, wherein the mixture is essentially free from compounds comprising more than two carboxylic acid groups or alcohol groups.

BACKGROUND OF THE INVENTION

Synthetic polymers such as acrylic polymers have, for the most part, replaced naturally occurring materials such as animal glues, starches and vegetable gums in many adhesive applications. The key to this replacement was the development and use of tackifier resins in the formulation with synthetic polymers, because they give the system the ability to wet the substrate surface and thus form a strong bond. Without tackifiers in the adhesive formulation, the synthetic polymers have low tack and peel adhesive performance.

Various resinous materials have been suggested as tackifiers for synthetic polymers. Examples of materials suggested include rosin, disproportionated rosin, rosin esters such as glycerol esters of rosin and pentaerythritol esters of rosin, aliphatic hydrocarbon resins from petroleum, aromatic petroleum resins, dicyclopentadiene (DCPD) resins, terpene resins, terpent/phenol resins and cumarone/indene resins.

Tackifiers are resins that can be considered as high viscosity solvents for the base polymer. The term tackifier therefore, cannot be given to any material unless we relate that material to the product that it tackifiers.

Acrylic polymer compositions have long been used as adhesive compositions, particularly in pressure sensitive adhesive (PSA) compositions. Common PSA compositions include a high-molecular-weight acrylic base polymer and a tackifying resin and when required, plasticizer, stabilizer, antioxidant, filler, coloring agent and the like. PSA compositions should have a high initial tack so that the adhesive surface merely needs to be contacted and pressed to the surface to achieve bonding. There should be little or no requirement to hold the adhesive and substrate in position for any significant time while a bond develops.

In developing adhesive formulations one seeks the optimum combination of several adhesive properties and since it is not generally possible to achieve the optimum for every property it is necessary to obtain the best balance of properties for the particular use in mind. In e.g. PSA compositions which are used in the label industry one tries to optimise the loop tack and peel and at the same time provide an adhesive whose component will not migrate during storage.

Nowadays mainly rosin derivatives, such as disproportionated rosin acids, and hydrocarbon resins are commercially used as tackifiers for adhesive compositions comprising acrylic polymers. The rosin derivatives have been preferred due to better compatibility with acrylics.

Initially most important were the solvent acrylics, but environmental, health and safety needs of industry have resulted in dramatic growth in water borne adhesive compositions comprising acrylic polymers. With increasing desirability of water borne systems and often their demonstration of significant performance enhancements with tackifier resins, new tackifier resins suitable for these systems are being sought.

U.S. Pat. No. 5,120,781 discloses tackifiers for hot melt adhesive compositions. The tackifiers are produced by reacting rosin and a polyhydric alcohol under conditions effective to substantially complete the esterification reaction. The resulting reaction product is then reacted with an aromatic dibasic acid providing a tackifier with a content of rosin above 78 weight %.

U.S. Pat. No. 4,981,939 refers to a binder for preparing toners which are used for developing electrostatic images formed in the process of electrography. The toner comprises as the main component a polyester composed of a polybasic acid component and a polyhydric alcohol component and a rosin modified polyhydric alcohol. The rosin modified polyhydric alcohol is produced by reacting a polyhydric alcohol having three or more hydroxyl groups with a rosin resulting in a polyester network (cross-linking).

WO 9942508 relates to low viscosity aromatic polyester polyols prepared by reacting a phthalic acid based material with diethylene glycol, a higher functional polyol having an average functionality of greater than two and a long chain alkyl acid, ester or oil. The resulting aromatic polyester polyol is a branched polyester.

U.S. Pat. No. 3,438,918 refers to rubber compositions obtained by reacting polyhydric alcohols, polybasic acids and oils.

Thus one advantage of the present invention is to provide a tackifier which is compatible with water borne pressure sensitive adhesive compositions and hot melt pressure sensitive adhesive compositions.

The further advantage with the present invention is the improvement of overall adhesive properties of adhesive compositions and specifically improving the properties of loop tack and peel and at the same time provide an adhesive (composition) whose component(s) will not migrate during storage.

A still further advantage with the present invention is to provide a polyester tackifier comprising a minimum amount of rosin derived from natural sources thereby reducing the cost of production, i.e. a polyester which is capped at both ends with a monofunctional compound (a polyester containing not more than two rosin residues).

Another advantage with the present invention is to provide a straight chain polyester resin being solid or liquid.

Still further advantages of the present invention are disclosed by the following specification.

DETAILED DESCRIPTION OF THE INVENTION

The present invention relates to a polyester tackifier and a pressure sensitive adhesive composition comprising the polyester tackifier according to the claims. More specifically, the present invention relates to a polyester tackifier which is obtainable by polymerising a mixture comprising a diacid or derivative thereof, a diol, and at least 6 molar % of an organic monofunctional compound, wherein the mixture is essentially free from compounds comprising more than two carboxylic acid groups or alcohol groups and a pressure sensitive adhesive composition comprising said polyester tackifier. The present invention also relates to the use of the polyester tackifier, an aqueous pressure sensitive adhesive composition, a hot melt pressure sensitive adhesive composition and a method for manufacturing a polyester tackifier.

The polyester tackifier is suitably obtained by esterification of at least one diacid or derivative thereof, at least one diol, and at least 6 molar % of an organic monofunctional compound, wherein the mixture is essentially free from compounds comprising more than two carboxylic acid groups or alcohol groups, i.e. suitably essentially free from compounds comprising more than two functional groups enabling the compounds of taking part in the polymeric esterification reaction. The diols and diacids preferably will produce an alternating linear/non-branched condensation polymer which is terminated at both ends by the organic monofunctional compound, the latter functioning as a chain stopper, i.e. capper.

The diacids which can be used in the present invention are organic diacids such as organic dicarboxylic acids or derivatives thereof. By derivatives thereof is meant acid anhydrides or any other acid capable of forming an ester moiety in the polyester. Suitably, the dicarboxylic acids are aliphatic, cyclic or aromatic, whereby aromatic dicarboxylic acids or derivatives thereof are preferred. Even more preferred are aromatic dicarboxylic acids having the dicarboxylic acid moieties in para or ortho position such as terephthalic acid and phthalic acid. Aromatic dicarboxylic acids having the diacid moiety in the ortho position are especially favourable such as phthalic acid. The aliphatic diacids can be branched or linear comprising from 4 up to 12 carbon atoms. The term diacids also encompasses acid anhydrides where appropriate as well as chlorides and esters of carboxylic acids. Examples of useful diacids are selected from the group comprising terephthalic acid, isophthalic acid, phthalic acid, malonic acid, dimethyl malonic acid, succinic acid, glutaric acid, adipic acid, trimethyladipic acid, pimelic acid, 2,2-dimethylglutaric acid, azelaic acid, sebacic acid, fumaric acid, maleic acid, itaconic acid, pimelic acid, 1,3-cyclopentanedicarboxylic acid, 1,2 cyclohexanedicarboxylic acid, 1,4-cyclohexanedicarboxylic acid, 2,5 norbornanedicarboxylic acid, 1,4 naphthalic acid, diphenic acid, 4,4'-oxydibenzoic acid, diglycolic acid, 2,5-naphtalenedicarboxylic acid and/or mixtures thereof.

The diols, often also referred to as glycols, used in the present invention are preferably linear or branched aliphatic diols, cyclic diols, aromatic diols, alkylene glycols or polyalkylene glycols or mixtures thereof, whereby alkylene glycols or polyalkylene glycols or mixtures thereof are especially preferred. Specific polyalkylene glycols may be polyethylene glycol and polypropylene glycol notably having from 1 up to 4 repeating alkylene oxide units, more preferably from 2 up to 3 repeating units. The polyoxyalkylene glycols may comprise both ethylene oxide and propylene oxide unit. Suitable diols are selected from the group of ethylene glycol, propylene glycol, diethylene glycol, triethylene glycol, tetraethylene glycol and dipropylene glycol or mixtures thereof. Other suitable diols can be selected from the group of 1,3-propanediol, 1,3-butanediol, 1,4-butanediol, 1,5-pentanediol, 1,6-hexanediol, 1,7-heptanediol, 1,8-octanediol, 1,9-nonanediol, 1,10decanediol, 2-methyl-1,3-propanediol, 2,4-dimethyl-2-ethylhexane-1,3-diol, 2,2-dimethyl1,3-propanediol, 2-ethyl-2-butyl-1,3-propanediol, 2-ethyl-2-isobutyl-1,3-propanediol, 3methyl-1,5-pentanediol, 2,2,4-trimethyl-1,6-hexanediol, 1,2-cyclohexanedimethanol, 1,3cyclohexanedimethanol, 1,4-cyclohexanedimethanol, 2,2,4,4-tetramethyl-1,3cyclobutanediol, 4,4'-methylenediphenol, 4,4'-(2-norbornyliden)-diphenol, 4,4'dihydroxybiphenol, o-, m-, p-dihydroxybenzene, 4,4'-isopropylidenediphenol, 2,5naphtalenediol, p-xylenediol, cyclopentane-1,2-diol, cyclohexane-1,2-diol, cyclohexane1,4-diol, etherified diphenols such as bisphenol A-alkylene oxide adducts and/or mixtures thereof.

The organic monofunctional compounds used in the present invention are suitably monocarboxylic acids or monohydric alcohols. Preferably, the organic monofunctional compounds are monocarboxylic acids exemplified by rosins (colophonies) derived from natural sources such as gum rosins, wood rosins and tall-oil rosins. These naturally occurring rosins are suitably mixtures and/or isomers of monocarboxylic tricyclic rosin acids usually containing 20 carbon atoms. The tricyclic rosin acids differ mainly in the position of the double bonds. Typically the rosin is a mixture of substances comprising levopimaric acid, neoabietic acid, palustric acid, abietic acid, dehydroabietic acid, seco-dehydroabietic acid, tetrahydroabietic acid, dihydroabietic acid, pimaric acid, and isopimaric acid. The rosins derived from natural sources also include rosins, i.e. rosin mixtures, modified notably by polymerisation, isomerisation, disproportionation and hydrogenation. Furthermore, the rosins may be treated with an aldehyde, for example formaldehyde, giving a rosin alcohol. Apart from rosins, carboxylic acids, such as naphtenic acid, and carboxylic acid or alcohol functionalised petroleum resins (aliphatic and/or aromatic) can be used. The mixture comprises suitably at least 10 molar % of the organic monofunctional compound, preferably, at least 15 molar %.

The polyester tackifier is suitably prepared by polymerising a mixture comprising from 15 up to 45 molar %, based on total monomers, more preferably from 20 up to 40 molar % and most preferably from 30 up to 35 molar % of a diacid, from 30 up to 55 molar %, based on total monomers, more preferably from 40 up to 55 molar % and most preferably from 45 up to 50 molar % of a diol, and from 6 up to 40 molar %, based on total monomer, more preferably from 10 up to 40 molar % and most preferably from 15 up to 35 molar % of a monofunctional compound, wherein the mixture is essentially free from compounds comprising more than two carboxylic acid groups or alcohol groups. Suitably, the mixture is essentially free from any compound comprising more than two functionalities which can take part in the polymerisation reaction, i.e. compounds comprising more than two functionalities or derivatives thereof which can be contained in the polyester tackifier. By essentially free is usually meant that the mixture comprises less than 5 molar %, preferably less than 1 molar %, most preferably less than 0.1 molar %, based on total monomers, of compounds comprising more than two carboxylic acid groups or alcohol groups. Thus, the polyester tackifier is suitably a non-branched polyester. In case where an excess of diol over diacid is present in the monomer mixture, a monocarboxylic acid usually is employed as chain stopper to "cap" the polyester whereby a monocarboxylic acid (rosin) terminated polyester is obtained. In the reversed situation, excess diacid over diol present in the monomer mixture, a monohydric alcohol can be employed as chain terminator to cap the polyester.

The polyester tackifier of the present invention is suitably formed by a condensation polymerisation (esterification) carried out in an inert gas atmosphere. Furthermore, the condensation reaction may be conducted in the presence of catalytical amounts of at least one esterification catalyst. Usually esterification catalysts include phosphoric acid, phosphorous acid, hypophosphorous acid, para-toluene sulfonic acid, lithium carbonate, calcium hydroxide, zinc oxide or mixtures thereof. Additionally, a disproportionation catalyst may be present if one or more rosins are employed. Examples of disproportionation catalyst can be supported or non-supported metals such as palladium, nickel and platinum and furthermore iodine, iodides, sulfides, mono- and poly phenol sulfides (i.e. amylophenol sulfide polymer). The esterification catalyst is generally present in amounts between about 0.01 and 0.1 weight %, notably between 0.05 and 0.07 weight %; while the disproportionation catalyst usually is present in amounts between about 0.1 and 0.3%, all being weight percents based on the weight of total monomers. In those embodiments utilising esterification and/or disproportionation catalysts, the catalyst is suitably added after the building blocks have been molten.

The monomer mixture is generally polymerised at a temperature ranging from 150° C. up to 350° C., usually from 220° C. up to 280° C., and most preferably from 250° up to 260° C. until distillation of water has ceased. Typically the reaction time may vary, from 10 up to 30 hour, more preferably from 12 up to 20 hour, and most preferably from 14 up to 16 hours. The reaction usually is terminated when the acid value has dropped below 25 mg KOH/g and/or the acid value change has dropped below 1 mg KOH/g/hour.

The polyester resins according to the invention preferably have number average molecular weight (Mn) between 400 and 6000, more preferably between 400 and 2000, and most preferably between 500 and 1800. The molecular weight distribution of the resins, measured by the polydispersity index generally ranges from 1.1 up to 2.0 and more preferably from 1.1 up to 1.3.

The physical state of the polyester resin can be solid or liquid at ambient temperature depending on reaction conditions and monomers used, specifically which type of diols are used. The novel polyester resins are suitably blended with other tackifiers such as pentaerythritol esters of rosin.

The present invention also refers to pressure sensitive adhesive compositions comprising a polymer and the polyester tackifier described above. Pressure sensitive adhesive compositions comprising the polyester tackifier described above are especially advantageous for low temperature applications such as giving good adhesive properties when used at temperatures well below 0° C. In addition, adhesive compositions can be produced at lower cost with corresponding or improved tackifier properties when all or part of the conventional tackifiers, e.g. tackifiers based on pentaerythritol, are substituted by the above defined novel polyester tackifier.

The present invention furthermore refers to the use of the tackifier for pressure sensitive compositions.

According to one preferred embodiment of the present invention the polyester tackifier is comprised in aqueous pressure sensitive adhesive (PSA) compositions further containing other polymers.

The tackifier is preferably supplied in form of an aqueous dispersion. The tackifier is dispersed in water using dispersing agents such as ethoxylated phosphate ester surfactants. The amount of dispersing agent used is usually from 2 up to 6 weight % based on tackifier. The polyester tackifier is suitably present in the aqueous tackifier dispersion in an amount from 40 up to 65 weight % based on total tackifier dispersion, more preferably from 50 up to 57 weight %.

The pressure sensitive adhesive compositions and the aqueous adhesive compositions according to the present invention comprise polymers. Suitable polymers are exemplified by natural and synthetic rubbers such as polychloroprene rubber, styrene-butadiene rubbers, SIS block copolymers, styrene butadiene styrene (SBS) block copolymers, VAE (vinylacetate ethylene copolymers), nitrile rubbers and polyisobutylene rubbers, acrylate polymers, acrylic polymers such as acrylic esters and methacrylate polymers or mixtures thereof.

Especially suitable polymers used in aqueous adhesive compositions according to the invention are acrylic polymers and/or acrylic ester copolymers dispersed in an aqueous phase which can be obtained by emulsion polymerisation of a wide range of olefins and acrylates such as 2-ethylhexyl acrylate and butyl acrylate. The polymer is suitably present in the form of an aqueous polymer dispersion in an amount from 50 up to 70 weight % based on total polymer dispersion, preferably from 55 up to 65 weight %.

The aqueous adhesive composition usually comprises the tackifier dispersion in an amount from 10 up to 40 weight % based on total aqueous composition, preferably from 20 up to 30 weight %, and the polymer dispersion in an amount from 60 up to 90 weight % based on total aqueous composition, preferably from 70 up to 80 weight %.

Other compounds known to the person skilled in the art may also be comprised in the water borne adhesive composition exemplified by plasticisers, stabilisers, antioxidants, fillers, colouring agent and the like.

According to a further preferred embodiment, the polyester resin tackifier is comprised in a hot melt pressure sensitive adhesive (PSA) composition. Accordingly, the present invention encompasses hot melt pressure sensitive adhesive composition comprising the above defined polyester tackifier. The hot melt compositions, preferably contains polymer resins including ethylenic copolymers of ethylene and other various monomers such as vinyl acetate, methyl acrylate, ethyl acrylate and other acrylates. In addition, styrenic block copolymers (SBC), such as styrene-butadiene-styrene (SBS), styrene-isoprene-styrene (SIS) and styrene-ethylene-butylene-styrene (SEBS) are employed in the present invention. Ethylene/vinyl acetate (EVA) and SBS polymers are particularly preferred.

In addition, ethylenic copolymer-based hot melt compositions may comprise mineral waxes such as paraffin wax and microcrystalline wax and synthetic waxes such as polyethylene wax and polypropylene wax. Other animal or vegetable waxes may also be used.

Preferred examples of oil used in the SBC-based hot melt compositions of the present invention include mineral oils of relatively high molecular weight and olefin oligomers. Other vegetable and/or animal oils may be used.

The polyester tackifier is preferably added to the hot melt composition from 10 up to 60% by weight based on total composition more preferably from 30 up to 60% by weight.

The styrenic block copolymers are suitably added from 10 up to 75% by weight more preferably from 10 up to 40% by weight.

The wax may be added from 5 up to 50% by weight, suitably from 5 up to 30% by weight.

The amount of polymers/copolymers and other compounds contained in the adhesive compositions, Le. aqueous compositions or hot melt compositions, is/are not critical and may vary so as to give the preferred properties of the adhesive composition. The compounds can be in any physical state guided by the state of the adhesive composition such as dispersed in an aqueous phase, liquid or solid.

The invention is further illustrated by the following examples, which, however, are not intended to limit the same. All units (parts or percentages) are by weight unless otherwise indicated.

EXAMPLES OF THE INVENTION

Table 1 illustrates the product properties when using the raw materials stated therein. Abbreviations used in the table for the building blocks (a), (b), and (c) are deg for diethylene glycol, mpdiol for 2-methyl-1,3-propanediol, chdm for 1,4-cyclohexanedimethanol, meg for ethylene glycol, adipic for adipic acid, pza for phthalic anhydride, aze for azelaic acid, rosin for natural Chinese gum rosin, napht for naphtenic acid, HCR for carboxylic acid functionalized petroleum hydrocarbon resins (e.g. Modified hydrocarbon resin AG-12-28 from Neville Chemical Company), form ros for formaldehyde treated natural Chinese gum rosin.

TABLE 1

Product properties of various polyester resins

| No | Diol (a) | Diacid (b) | Capper (c) | Ratios | Mn | Mw/Mn | Visco | SP | AV | Color |
|----|----------|------------|------------|----------|------|-------|-------|------|----|-------|
| 1  | Deg      | Adipic     | Rosin      | 34/33/33 | 840  | 1.2   | 525   | —    | 24 | 10    |
| 2  | Deg      | Pza        | Napht      | 35/33/32 | 950  | 1.1   | 1600  | —    | 13 | 12    |
| 3  | Mpdiol   | Aze/pza    | Rosin      | 29/31/8/32 | 960 | 1.1  | 1900  | —    | 18 | 6     |
| 4  | Deg      | Pza        | Rosin      | 30/14/56 | 560  | 1.1   | 5150  | —    | 20 | 4.5   |
| 5  | Deg      | Pza        | Rosin      | 34/33/33 | 870  | 1.1   | 11200 | —    | 22 | 2     |
| 6  | Meg      | Pza        | Rosin      | 40/51/9  | 1600 | 1.3   | 20000 | —    | 25 | 3.5   |
| 7  | Meg      | Pza        | Rosin      | 24/38/38 | 740  | 1.1   |       | 44.7 | 15 | 4     |
| 8  | Deg      | Pza        | HCR        | 26/36/38 | 1610 | 1.2   |       | 63.5 | 23 | 9     |
| 9  | Deg      | Pza        | Form ros   | 19/9/72  | 680  | 1.2   |       | 76.0 | 78 | 4     |
| 10 | Chdm     | Pza        | Rosin      | 42/29/92 | 910  | 1.2   |       | 7938 | 16 | 3     |

Ratios respectively diol/diacid/capper all in weight % of the total weight, Mn = Number average molecular weight (g/mol), MwlMn = polydispersity index, Visco = Viscosity measured at 50° C. on Brookfield viscometer (mPa · s), AV = Acid Value (mg KOH/g), SP = Softening Point Mettler eC).
Color = Color Gardner Entry no. 5 and 4 are described in more detail in example 1 and 2 respectively. These examples illustrate the production and use as tackifier of the polyester resins in more detail.

Example 1

A reaction vessel equipped with a nitrogen inlet, thermometer, stirrer and rectification column was charged with 500 g Chinese gum rosin, 505 g phthalic anhydride and 530 g diethylene glycol. The reaction mixture was heated until a homogeneous melt resulted, then 2 g of Vultac 2 (Elf Atochem) disproportionation catalyst was added. The temperature was raised to 180° C. and held there for one hour. Then the temperature was gradually increased to 250° C. The reaction was conducted at that temperature for 20 hours and discontinued when distillation of water ceased. A product was recovered with an acid value of AV=22 mg KOH/g, a viscosity (brookfield at 50° C.) of 11200 mPa.s, number average molecular weight of Mn=870, and polydispersity of Mw/Mn=1.1. The color Gardner was 2.

1500 g of this polyester resin was dispersed in water using the procedure described in patent WO9412272 (U.S. Pat. No. 5,552,519). This yielded the tackifier dispersion (A)

Of this polyester resin 350 g was blended with 650 g of a stabilised glycerol ester of rosin. This blend was then dispersed in water with the aid of 60 g ethoxylated phosphate ester surfactant. This yielded the tackifier dispersion (B).

Example 2

A reaction vessel equipped with a nitrogen inlet, thermometer, stirrer, and rectification column was charged with 800 g Chinese gum rosin, 200 g phthalic anhydride and 424 g diethylene glycol. The temperature is raised to 180° C. and held there for one hour. Then the temperature is gradually increased to 250° C. The reaction was conducted at that temperature for 17 hours and discontinued when distillation of water ceased. A product was recovered with an acid value of A V=20 mg KOH/g, a viscosity (brookfield at 50° C.) of 5150 mPa.s, number average molecular weight of Mn=560, and polydispersity of Mw/Mn=1.1. The color Gardner is 4.5.

Of this polyester resin 700 g was blended with 300 g of a pentaerythritol ester of rosin. This blend was then dispersed in water with the aid of 60 g ethoxylated phosphate ester surfactant. This yielded the tackifier dispersion (C).

Adhesive Test Results

Acronal V210, Primal EP5560, and Flexcryl 1625 are aqueous acrylic polymer dispersions available from respectively BASF, Rohm & Haas Co., and Air Products. Table 2 illustrates PSA performance using standard test methods (FINAT test methods for selfadhesive materials; Shear: FTM8, Peel: FTM1, Looptack: FTM9). Each adhesive composition was blended in aqueous form in parts by weight and coated onto silicone release liner. The coat weight is 20±1 g/sq.m. The coated films were dried for 3 minutes at 90° C. The films were transfer coated to 80 grams plain paper facestock and were then covered with release paper and allowed to set overnight at room temperature and 50% humidity.

TABLE 2

Adhesive performance test result

| System | Shear (hours) | Peel LDPE (N) | Looptack Card (N) | Looptack Steel (N) | Looptack LDPE (N) |
|---|---|---|---|---|---|
| 100% Acronal V210 | 27.0 CF | 5.1 AF | 12.5 AF | 12.1 AF | 5.1 AF |
| 70% Acronal V210/ 30% Tackifier Dispersion A | 0.6 | 13.9 AF/PD | 19.3 AF/sCF | 11.6 AF | 8.9 AF |
| 70% Acronal V210/ 30% Tackifier Dispersion B | 6.3 CF | 13.2 AF | 20.1 AFI sPT | 17.3 AF | 10.7 AF |
| 70% Acronal V210 I 30% Tackifier Dispersion C | 3.5 CF | 11.1 AF/PD | 18.3 AF/sPT | 14.9 AF | 11.9 AF |
| 100% Primal EP5560 | 11.2 CF | 2.6 AF | 4.0 AF | 9.1 AF | 3.0 AF |
| 70% Primal EP5560 | 1.0 | 4.6 | 14.3 | 8.3 | 4.5 |

TABLE 2-continued

Adhesive perfonnance test result

| | | Peel | | Looptack | |
|---|---|---|---|---|---|
| System | Shear (hours) | LDPE (N) | Card (N) | Steel (N) | LDPE (N) |
| 30% Tackifier Dispersion A | | AF | AF/sCF | AF | AF |
| 70% Primal EP5560 I | 4.0 | 12.5 | 18.9 | 11.4 | 9.9 |
| 30% Tackifier Dispersion C | CF | AF/PD | AF | AF | AF |
| 100% Flexcryl 1625 | 19.3 | 5.3 | 14.6 | 9.9 | 5.3 |
| | | AF | AF | AF | AF |
| 70% Flexcryl 1625 | 0.5 | 10.3 | 18.7 | 9.2 | 6.5 |
| 30% Tackifier Dispersion A | | AF/PD | AF/sCF | AF | AF |
| 70% Flexcryl 1625 | 1.3 | 13.0 | 20.1 | 16.0 | 10.6 |
| 30% Tackifier Dispersion B | | AF/PD | AF/sCF | AF | AF |

Shear = 1000 g/sq. in. to glass, LOPE tests on untreated film, Peel test is 180° peel, CF = cohesive failure, sCF = slight cohesive failure, AF = adhesive failure, PO = paper deformation, sPT = slight paper tear, PO = paper deformation From the results in table 2 it can be concluded that the dispersions containing the novel polyester tackifiers have improved adhesive properties in terms of peel and looptack.

What is claimed is:

1. An aqueous or a hot melt pressure sensitive adhesive composition comprising a polymer and a non-branched polyester tackifier, wherein the polyester tackifier is obtained by polymerizing a mixture comprising a diacid or derivative thereof, a diol, and between 6 molar % and 40 molar % of an organic monofunctional compound, the mixture being essentially free from compounds comprising more than two carboxylic acid groups or two alcohol groups.

2. A pressure sensitive adhesive composition according to claim 1, wherein the mixture comprises from 15 up to 45 molar % of a diacid, from 30 up to 55 molar % of the diol.

3. A pressure sensitive adhesive composition according to claim 1, wherein the mixture comprises from 10 molar % up to 40 molar % of the organic monofunctional compound.

4. A pressure sensitive adhesive composition according to claim 1, wherein the mixture comprises from 15 molar % up to 35 molar % of an organic monofunctional compound.

5. A pressure sensitive adhesive composition according to claim 1, wherein the organic monofunctional compound is a monocarboxylic acid or monohydric alcohol.

6. A pressure sensitive adhesive composition according to claim 5, wherein the organic monofunctional compound is a monocarboxylic acid.

7. A pressure sensitive adhesive composition according to claim 6, wherein the monocarboxylic acid is a rosin derived from natural sources.

8. A pressure sensitive adhesive composition according to claim 1, wherein the diacid is an aromatic diacid.

9. A pressure sensitive adhesive composition according claim 1, wherein the diol is an alkylene glycol or a polyalkylene glycol or a mixture thereof.

10. A method of bonding an adhesive and substrate by contacting the pressure sensitive adhesive composition of claim 1 with a substrate and pressing it to the substrate.

11. A pressure sensitive adhesive composition according to claim 1, wherein the mixture comprises less than 1 molar % based on total monomers of compounds comprising more than two carboxylic acid groups or two alcohol groups.

12. A pressure sensitive adhesive composition according to claim 1, wherein the derivative of the diacid is capable of forming an ester moiety in the polyester.

13. A pressure sensitive adhesive composition according to claim 8, wherein the aromatic diacid has dicarboxylic acid moieties in the para or ortho position.

14. A pressure sensitive adhesive composition according to claim 13, wherein the aromatic diacid is terephthalic or phthalic acid.

15. The pressure sensitive adhesive according to claim 1 wherein the tackifier has a number average molecular weight between 400 and 6000.

16. The pressure sensitive adhesive according to claim 1 wherein the tackifier has a polydispersity from 1.1 to 2.0.

17. A method of making a non-branched polyester tackifier comprising polymerizing a mixture of diacid or derivative thereof, a diol and between 6 molar % and 40 molar % of an organic monofunctional compound in an inert gas atmosphere at a temperature between 150° C. to 350° C., wherein the mixture is essentially free from compounds comprising more than two carboxylic acid groups or two alcohol groups.

18. The pressure sensitive adhesive composition of claim 1 wherein the polyester tackifier is non-aqueous and is present is an amount between 30 and 60 molar %, based on the total composition.

19. The pressure sensitive adhesive composition of claim 1 wherein the polymer is a thermoplastic.

\* \* \* \* \*